United States Patent
Nakai (10) Patent No.: US 8,310,188 B2
(45) Date of Patent: Nov. 13, 2012

(54) MOTOR DRIVE CIRCUIT WITH SHORT STARTUP TIME

(75) Inventor: Tatsuji Nakai, Kyoto (JP)

(73) Assignee: Rohm Co., Ltd. (JP)

( * ) Notice: Subject to any disclaimer, the term of this patent is extended or adjusted under 35 U.S.C. 154(b) by 839 days.

(21) Appl. No.: 12/439,643

(22) PCT Filed: Aug. 29, 2007

(86) PCT No.: PCT/JP2007/000929
§ 371 (c)(1),
(2), (4) Date: Mar. 2, 2009

(87) PCT Pub. No.: WO2008/026319
PCT Pub. Date: Mar. 6, 2008

(65) Prior Publication Data
US 2010/0026219 A1 Feb. 4, 2010

(30) Foreign Application Priority Data
Aug. 30, 2006 (JP) ................................. 2006-234208
Sep. 6, 2006 (JP) ................................. 2006-242040

(51) Int. Cl.
*H02P 6/00* (2006.01)
(52) U.S. Cl. ......... 318/400.29; 318/400.39; 318/400.06; 318/811
(58) Field of Classification Search ............. 318/400.29, 318/400.39, 400.06, 811
See application file for complete search history.

(56) References Cited

U.S. PATENT DOCUMENTS
| | | |
|---|---|---|
| 2005/0052147 A1 | 3/2005 | Yoshitomi et al. |
| 2005/0269985 A1 | 12/2005 | Yoshitomi et al. |
| 2009/0039807 A1* | 2/2009 | Yabusaki et al. ............ 318/244 |

FOREIGN PATENT DOCUMENTS
| | | |
|---|---|---|
| CN | 1505253 A | 6/2004 |
| JP | 7227061 A | 8/1995 |
| JP | 200136612 A | 2/2001 |
| JP | 2002135871 A | 5/2002 |
| JP | 200464802 A | 2/2004 |
| JP | 2004153955 A | 5/2004 |
| JP | 2004-533799 | 11/2004 |
| JP | 2006180608 A | 7/2006 |
| TW | 229973 B | 3/2005 |

OTHER PUBLICATIONS

Japanese Office Action for Japanese Patent Application No. 2008-502064 with English Translation dated Jan. 18, 2011.

(Continued)

*Primary Examiner* — Bentsu Ro
*Assistant Examiner* — Erick Glass
(74) *Attorney, Agent, or Firm* — Cantor Colburn LLP (57) ABSTRACT

An H-bridge circuit is connected to a coil of the vibration motor that is to be driven. A comparator receives Hall signals indicating position information of a rotor of the vibration motor, and converts to an FG signal. A pulse width modulator generates a pulse-modulated pulse signal specifying energization time of the coil of the vibration motor. The pulse width modulator, in a first mode, after commencing start-up of the vibration motor, sets a duty ratio of the pulse signal to 100%, and after that, switches the duty ratio to a predetermined value in accordance with rotational frequency of the motor. In a second mode, the duty ratio of the pulse signal continues to be set to 100%. In a third mode, frequency and the duty ratio of the pulse signal are set based on a control signal of a pulse form inputted from outside. The control signal is used also in switching mode.

20 Claims, 7 Drawing Sheets

OTHER PUBLICATIONS

Chinese Office Action for Chinese Application No. 200780001731.6 issued on Sep. 27, 2010 with English translation.
International Search Report for International Application No. PCT/JP2007/000929 mailed Nov. 27, 2007 with English Translation.
International Preliminary Report on Patentability for International Application No. PCT/JP2007/000929 issued Mar. 3, 2009 with English Translation.

* cited by examiner

MOTOR DRIVE CIRCUIT WITH SHORT STARTUP TIME

CROSS REFERENCE TO RELATED APPLICATIONS

This is a U.S. national stage of application No. PCT/JP2007/000929, filed on 29 Aug. 2007. Priority under 35 U.S.C. §119(a) and 35 U.S.C. §365(b) is claimed from Japanese Application No. 2006-234208, filed 30 Aug. 2006, and Japanese Application No. 2006-242040, filed 6 Sep. 2006, the disclosure of which is also incorporated herein by reference.

FIELD OF THE INVENTION

The present invention relates to motor drive technology.

DESCRIPTION OF THE RELATED ART

In electronic devices such as mobile telephones, pagers, and the like, a vibration motor is installed to notify a user of an incoming message. In this vibration motor, by connecting a weight that is eccentric to a rotational axis and rotating a rotor, the electronic device is made to vibrate. In such a vibration motor, since the weight, which is connected as a load, is eccentric, a drive circuit dedicated to the vibration motor (referred to below as simply a vibration motor drive circuit) is used. Related technology is described in Patent Documents 1 and 2.

Patent Document 1: Japanese Patent Application, Laid Open No. 2004-64802
Patent Document 2: Japanese Patent Application, Laid Open No. 7-227061

Brush motors and brushless motors exist for vibration motors; when a brushless motor is being driven, a rotor position of the motor is detected by a Hall element, and an energization state of a coil of the motor is controlled by an H-bridge circuit. The brushless motor has advantages of being small-sized and having a long life, in comparison to a brush motor, but since the rotor is heavy due to an eccentric weight, there has been a problem in that starting the motor takes time.

If it is desired to speed up the starting, methods of raising drive voltage of the motor, that is, a power supply voltage, or of switching motor impedance to increase drive current, can be considered, but since power consumption increases, these methods are not desirable in battery-driven electronic devices.

SUMMARY OF THE INVENTION

The present invention was made in view of these problems, and one general purpose thereof is the provision of motor drive technology in which the vibration motor can be started in a short time.

1. To solve the abovementioned problems, a motor drive circuit according to an embodiment of the invention is provided with: an H-bridge circuit connected to a coil of a motor that is to be driven; a comparator which receives a Hall signal indicating position information of a rotor of the motor, and converts the signal into a rectangular signal; a pulse modulator which generates a pulse-modulated pulse signal specifying energization time of the coil of the motor; and a pre-driver which drives the H-bridge circuit based on the pulse signal and the rectangular signal. The pulse modulator is configured to enable switching between a first mode in which, after commencing starting of the motor, a duty ratio of the pulse signal is set to 100% and, after that, the duty ratio is switched to a predetermined value in accordance with rotational frequency of the motor; a second mode in which the duty ratio of the pulse signal continues to be set to 100%; and a third mode in which the duty ratio and frequency of the pulse signal are set, based on a control signal of a pulse form inputted from outside.

According to the embodiment, by using the first mode, starting time-period of the motor can be shortened, and by using the second mode, rotational control in accordance with power supply voltage supplied to the H-bridge circuit can be realized. Furthermore, by using the third mode, since it is possible to freely set the duty ratio and the frequency of the pulse signal from outside, it is possible to perform parameter optimization and to further shorten the starting time-period A control signal inputted from outside may be inputted to the pulse modulator, and an operation mode may be switched in accordance with voltage level of the control signal. In such cases, the control signal, when at a first level, may be set to the first mode, the control signal, when at a second level different from the first level, may be set to the second mode, and the control signal, when inputted in a pulse form, may be set to the third mode The control signal inputted to the pulse modulator, when inputted in a pulse form, may alternately repeat a third level different from the first level and the second level, and either one of the first and the second levels, at a predetermined frequency and duty ratio.

By using the three different levels, it is possible to switch between the three modes by one signal, and also, in the third mode, to generate a pulse signal in accordance with the control signal.

The control signal inputted to the pulse modulator may, when inputted in a pulse form, alternately repeat the third level and the second level. The pulse modulator may set a logical value of the pulse signal so as to energize the coil of the motor when at the second level, and so that the motor regenerates when at the third level.

In such cases, the second level of the control signal is used in the second mode and the third mode, and in either mode, since a time period in which the control signal is at the second level corresponds to energization time of the coil of the motor, it is possible to simplify the circuit.

The third level may be an intermediate level between the first level and the second level.

The pulse modulator, in the first mode, may set the duty ratio of the pulse signal to 100%, in a predetermined time-period from commencing starting of the motor. In such cases, by adjusting the predetermined time-period, it is possible to optimize a starting operation.

The pulse modulator, in the first mode, may set the duty ratio of the pulse signal to 100%, in a time-period after commencing starting of the motor until rotational frequency of the motor reaches a predetermined value. In such cases, by adjusting the predetermined value, it is possible to optimize the starting operation.

A motor drive circuit in another embodiment of the invention is provided with a switching circuit which includes a plurality of transistors connected to a coil of a motor that is to be driven, and adjusts power supplied to the coil by making the transistors perform a switching operation; at least one comparator which detects a position of a rotor of the motor and generates an FG (Frequency Generation) signal in accordance with the detected position; a pre-driver which drives the switching circuit based on, at least, the FG signal; and a selector which switches drive mode of the circuit based on a control signal inputted from outside. The selector drives the motor by a drive system set in advance therein, in cases in which the control signal is a DC sign, and drives the motor by a pulse modulation system based on the control signal, in cases in which the control signal is a pulse signal.

The motor drive circuit may be monolithically integrated on one semiconductor substrate. "Monolithically Integrated" includes cases in which all component elements of the circuit may be formed on the semiconductor substrate, and cases in which main component elements of the circuit are integrated as a unit, and some resistors, capacitors, or the like, for adjusting a circuit constant may be arranged outside the semiconductor substrate. By integrating the drive circuit as one LSI, it is possible to reduce circuit area.

Another embodiment of the invention is a motor unit. This motor unit is provided with a vibration motor, a Hall element which outputs a Hall signal indicating position information of a rotor of the vibration motor, and the abovementioned drive circuit which drives the vibration motor based on the Hall signal.

According to this embodiment, it is possible to shorten starting time-period of a motor.

An even further embodiment of the invention is an electronic device. The electronic device is provided with a communication unit which communicates with a base station, and the abovementioned motor unit. When a messages arrives from the base station, the communication unit prescribes rotation of the vibration motor, to the motor unit.

According to this embodiment, since rotation of the vibration motor starts immediately a message arrives, the time until a user detects vibration of the electronic device and becomes aware of the incoming message can be shortened.

A still further embodiment of the invention is a method of driving a motor. This method includes a step of converting a Hall signal indicating position information of a rotor of a motor that is to be driven, into a rectangular signal; a step of selecting, among transistors that constitute a H-bridge circuit connected to a coil of the motor, based on the rectangular signal, either group of two groups of transistor pairs disposed in opposing corners, to be driven; a step of generating a pulse signal in a mode selected among three different modes; and a step of driving the selected transistor pair based on the pulse signal. The step of generating the pulse signal, in a first mode, after commencing starting of the motor, sets the duty ratio of the pulse signal to 100%, and after that, sets the duty ratio to a predetermined value in accordance with rotational frequency of the motor, in a second mode, continues to set the duty ratio to 100%, and in a third mode, sets the duty ratio and frequency of the pulse signal, based on a control signal of a pulse form, which is inputted from outside.

Another embodiment of the invention also relates to a motor driving method. This driving method includes a step of detecting a position of a rotor of the motor that is to be driven and generating an FG (Frequency Generation) signal in accordance with the detected position; a driving step of adjusting power supplied to a coil of the motor, by controlling ON and OFF states of a plurality of transistors connected to the coil of the motor that is to be driven, based on at least the FG signal; and a selection step of switching drive mode of the circuit based on a control signal inputted from outside. In the driving step, when the control signal is a DC signal, the motor is driven by a drive system set in advance, and when the control signal is a pulse signal, the motor is driven by a pulse modulation system based on the pulse signal.

2. According to an embodiment of the invention, a drive circuit of a vibration motor is provided. The drive circuit includes: a H-bridge circuit connected to a coil of the vibration motor that is to be driven; a comparator which receives a Hall signal indicating position information of a rotor of the vibration motor, and converts the signal into a rectangular signal; a pulse modulator which generates a pulse-modulated pulse signal specifying energization time of the coil of the vibration motor; and a pre-driver which drives the H-bridge circuit based on the pulse signal and the rectangular signal. After commencing starting of the vibration motor, the pulse modulator sets the duty ratio of the pulse signal to 100%, and after that, switches to a duty ratio in accordance with rotational frequency of the vibration motor.

According to this embodiment, immediately after commencing starting of the motor, the duty ratio is set to 100% to run at full drive, and after the rotational frequency has risen to a certain extent, by performing switch-driving by the pulse signal, it is possible to shorten starting time-period.

The pulse modulator may set the duty ratio of the pulse signal to 100% in a predetermined time-period from commencing starting of the vibration motor. In such cases, by adjusting the predetermined time-period, it is possible to optimize the starting operation.

Furthermore, an oscillator for setting the duty ratio of the pulse signal to a predetermined value in accordance with the rotational frequency of the vibration motor and an oscillator for measuring the predetermined time-period may be held in common. In such cases, it is possible to simplify the circuit.

The pulse modulator may set the duty ratio of the pulse signal to 100% in a time-period after commencing starting of the vibration motor, until the rotational frequency of the vibration motor reaches the predetermined value. In such cases, by adjusting the predetermined value, it is possible to optimize the start operation.

The drive circuit may be monolithically integrated on one semiconductor substrate. "Monolithically integrated" includes cases in which all component elements of the circuit may be formed on the semiconductor substrate, and cases in which main component elements of the circuit are integrated as a unit, and some resistors, capacitors, or the like, for adjusting a circuit constant may be arranged outside the semiconductor substrate. By integrating the drive circuit as one LSI, it is possible to reduce circuit area.

Another embodiment of the invention relates to a motor unit. This motor unit is provided with a vibration motor, a Hall element which outputs a Hall signal indicating position information of a rotor of the vibration motor, and the abovementioned drive circuit which drives the vibration motor based on the Hall signal.

Another embodiment of the invention relates to an electronic device. The electronic device is provided with a communication unit which communicates with a base station, and the abovementioned motor unit. When a messages arrives from the base station, the communication unit prescribes rotation of the vibration motor, to the motor unit.

According to this embodiment, since, when a message arrives, rotational frequency of the vibration motor reaches a predetermined value in a short time, the time until a user detects vibration of the electronic device and becomes aware of the incoming message can be shortened.

According to an even further embodiment of the invention, a method of driving the vibration motor is provided. This motor drive method includes a step of converting a Hall signal indicating position information of a rotor of the vibration motor into a rectangular signal; a step of generating a pulse-modulated pulse signal specifying energization time of a coil of the vibration motor; a step of generating a pulse signal whose duty ratio is 100% after commencing starting of the vibration motor, and after that, has a duty ratio according to rotational frequency of the vibration motor; a step of selecting, among transistors that constitute a H-bridge circuit connected to a coil of the vibration motor, based on the rectangular signal, either group of two groups of transistor pairs disposed in opposing corners, to be driven; and a step of driving the selected transistor pair based on the pulse signal.

According to this embodiment, immediately after commencing starting of the motor, the duty ratio is set to 100% to run at full drive, and after the rotational frequency has risen to a certain extent, by performing switch-driving by the pulse signal, it is possible to shorten starting time-period.

A still further embodiment of the invention is a motor drive circuit. The motor drive circuit is a drive circuit of a fan motor, and includes: an H-bridge circuit connected to a coil of the fan motor that is to be driven; a comparator which receives a Hall signal indicating position information of a rotor of the fan motor, and converts the signal into a rectangular signal; a pulse modulator which generates a pulse-modulated pulse signal specifying energization time of the coil of the fan motor; and a pre-driver which drives the H-bridge circuit based on the pulse signal and the rectangular signal. After commencing starting of the fan motor, the pulse modulator sets the duty ratio of the pulse signal to 100%, and after that, switches the duty ratio in accordance with rotational frequency of the fan motor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

The embodiments of the invention relate to drive technology for a vibration motor installed in an electronic device such as a mobile telephone or the like. A communication unit which communicates with a base station is installed in this electronic device, and when a messages arrives from the base station, the user is made aware of the incoming message by the vibration motor being made to rotate.

First Embodiment

Figure 1:
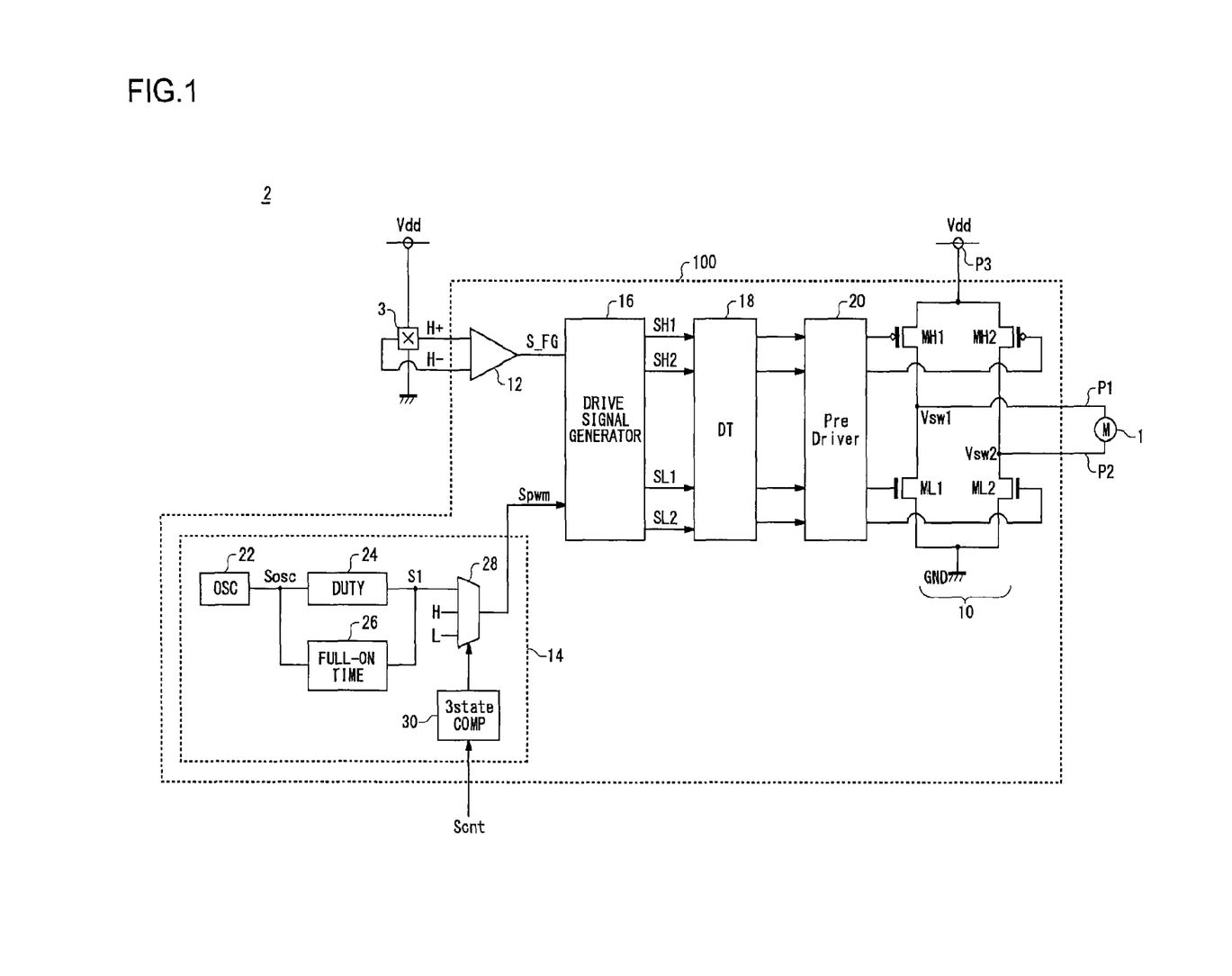
FIG. 1 is a circuit diagram showing a configuration of a motor unit including a vibration motor and a drive circuit for driving the vibration motor, according to a first embodiment of the invention.

FIG. 1 is a circuit diagram showing a configuration of a motor unit 2 including the vibration motor 1 and a motor drive circuit 100 for driving the vibration motor, according to a first embodiment of the invention. The motor unit 2 is provided with the vibration motor 1, a Hall element 3, and the motor drive circuit 100, and constitutes one package.

The vibration motor 1 is a brushless motor with an attached weight that is eccentric to a rotor axis, and is formed such that voltage can be applied from outside, to both terminals P1 and P2 of a coil. The Hall element 3 outputs Hall signals H+ and H− indicating position information of the rotor of the vibration motor 1. The Hall signals H+ and H− are periodic signals with mutually opposite phases, and have a frequency according to a rotational frequency of the vibration motor 1.

The motor drive circuit 100 determines drive phase of the vibration motor 1 based on the Hall signals H+ and H− outputted from the Hall element 3, and drives by controlling amount and direction of power supplied to the coil, that is, current flowing in the coil. The motor drive circuit 100 is monolithically integrated as a function IC on one semiconductor substrate.

The motor drive circuit 100 is provided with a H-bridge circuit 10, a comparator 12, a pulse width modulator 14, a drive signal generator 16, a dead time generator 18, and a pre-driver 20.

The H-bridge circuit 10 is connected to the terminals P1 and P2 of the vibration motor 1 that is to be driven. The H-bridge circuit 10 is a switching circuit which controls power supplied to the coil of the vibration motor 1, according to transistors therein being ON or OFF. The H-bridge circuit 10 includes a first high side transistor MH1, a second high side transistor MH2, a first low side transistor ML1, and a second low side transistor ML2. This H-bridge circuit 10 is equivalent to an output stage for driving the vibration motor 1. The first high side transistor MH1 and the first low side transistor ML1 are connected in series between a power supply voltage terminal P3 and a ground terminal GND. In the same way, the second high side transistor MH2 and the second low side transistor ML2 are also connected in series between the power supply voltage terminal P3 and the ground terminal GND. In the embodiment, the first high side transistor MH1 and the second high side transistor MH2 are P-channel MOSFETs. Furthermore, the first low side transistor ML1 and the second low side transistor ML2 are N-channel MOSFETs. These transistors may all be N-channel MOSFETs, or may be bipolar transistors.

A first switching voltage Vsw1 of a connection point of the first high side transistor MH1 and the first low side transistor ML1 is applied to the first terminal P1 of the vibration motor 1.

ON and OFF states of the first high side transistor MH1 and the first low side transistor ML1 are controlled by a first high side drive signal SH1 and a first low side drive signal SL1 applied to a gate of each transistor. When the first high side transistor MH1 is ON, the first switching voltage Vsw1 is a power supply voltage Vdd, and when the first low side transistor ML1 is ON, the first switching voltage Vsw1 is ground potential (0V).

In the same way, a second switching voltage Vsw2 of a connection point of the second high side transistor MH2 and the second low side transistor ML2 is connected to the second terminal P2 of the vibration motor 1. ON and OFF states of the second high side transistor MH2 and the second low side transistor ML2 are controlled by a second high side drive signal SH2 and a second low side drive signal SL2 applied to a gate of each transistor.

In the embodiment, among the transistors constituting the H-bridge circuit 10, with the low side transistors ML1 and ML2 fixed to be ON or OFF, the high side transistors MH1 and MH2 are switch-driven based on a pulse signal Spwm. Clearly, in another embodiment, in place of the high side transistors MH1 and MH2, the low side transistors ML1 and ML2 may be switch-driven based on the pulse signal Spwm. In an even further embodiment, both switching transistors positioned in opposite corners may be switch-driven by a synchronous rectification system, based on the pulse signal Spwm.

A comparator 12 receives the Hall signals H+ and H− indicating position information of the rotor of the vibration motor 1, and by performing a voltage comparison thereof, makes a conversion to an FG signal S_FG, which is a rectangular signal. The comparator 12, according to necessity, after amplifying the Hall signals H+ and H−, may perform a voltage comparison.

The pulse width modulator 14 generates the pulse signal Spwm specifying energization time of the coil of the vibration motor 1. As one characteristic of the motor drive circuit 100 according to the embodiment, the fact may be cited that the pulse width modulator 14 is configured to be operable in three modes, from a first mode to a third mode.

In the first mode, after commencing starting of the vibration motor 1, a duty ratio of the pulse signal Spwm is set to 100%, and after that, the duty ratio is switched to a predetermined value in accordance with rotational frequency of the motor. That is, in the first mode, the motor drive circuit 100 switches between full-on-time driving in which driving is done with the pulse signal Spwm having a duty ratio of 100%, and PWM driving in which the duty ratio is set in accordance with a target torque (rotational frequency). The first mode is a mode for driving the vibration motor 1 at high speed, and is also referred to as a high speed start mode.

In the second mode, the duty ratio of the pulse signal Spwm continues to be set to 100%. That is, in the second mode, full-on-time driving is performed consistently from commencing starting through to normal operation. The second mode is also referred to as a full-on-time driving mode.

In the third mode, the frequency and the duty ratio of the pulse signal Spwm are set based on a control signal of a pulse form inputted from outside. That is, the frequency and the duty ratio of the pulse signal Spwm are equal to those of the control signal Scnt. The third mode is also referred to as an external pulse drive mode.

Here, attention should be focused on the fact that by combining the second mode and the third mode a function the same as in the first mode is realized. That is, after commencing starting, by driving in the second mode for a constant time, and after that, by switching to the third mode, it is possible to drive at a full-on-time, immediately after starting, and after that, it is possible to drive the vibration motor 1 with the frequency and duty ratio of the control signal that has a pulse form.

Furthermore, as another characteristic of the motor drive circuit 100 according to the embodiment, the control signal for selecting the mode, and the control signal for setting the duty ratio and the frequency of the pulse signal Spwm in the third mode are the same signal.

The control signal Scnt inputted from outside is inputted to the pulse width modulator 14, and an operation mode is switched according to voltage level of the control signal Scnt.

Specifically, the control signal Scnt, when at a high level (a first level), is set to the first mode, and the control signal Scnt, when at a low level (a second level) different from the first level, is set to the second mode. Furthermore, the control signal Scnt, when inputted in a pulse form, is set to the third mode.

When the control signal Scnt is inputted in a pulse form, the control signal Scnt alternately repeats a third level and either one of the first and the second levels. The third level is a level that is different from the first level and the second level, and in the embodiment is an intermediate level. In the third mode, by having pulse amplitude at an intermediate level different from the first and second levels, it is possible to assuredly distinguish a mode prescribed by the control signal Scnt and to switch to this mode.

In the embodiment, the control signal Scnt, in the third mode, is a pulse signal that alternately repeats the intermediate level and the second level. The pulse width modulator 14 sets a logical value of the pulse signal Spwm so as to energize the coil of the vibration motor 1 when the control signal Scnt is at the low level (the second level), and so that the motor regenerates when at the intermediate level (the third level).

Below, an explanation is given concerning a configuration of the pulse width modulator 14. The pulse width modulator 14 includes an oscillator 22, a duty setting unit 24, a full-on-time setting unit 26, a selector 28, and a 3-state comparator 30.

The oscillator 22, the duty setting unit 24, and the full-on-time setting unit 26 are provided in order to generate a signal S1 used in the first mode. The oscillator 22 generates a pulse signal Sosc of a predetermined frequency. The duty setting unit 24 uses the pulse signal Sosc outputted from the oscillator 22 to generate the pulse signal S1 that has a predetermined duty ratio. The full-on-time setting unit 26 uses the pulse signal Sosc from the oscillator 22 to measure a predetermined starting time-period Ts. The full-on-time setting unit 26 fixes a level of the pulse signal S1 and sets the duty ratio to 100%, from commencing starting until the starting time-period Ts elapses.

As a result, the pulse signal S1 has a high level from commencing starting until before the starting time-period Ts elapses, and after that, becomes a pulse signal whose duty ratio has a predetermined value.

As an example of specific signal processing, the full-on-time setting unit 26 outputs a signal at a high level, in a time-period from commencing starting until the starting time-period Ts elapses, and after that, outputs a signal that transits to a low level. On the other hand, the duty setting unit 24 continues to output a pulse signal whose duty ratio has a predetermined value. A signal of a logical sum of the full-on-time setting unit 26 and the duty setting unit 24 is the pulse signal S1 that has the abovementioned characteristic.

Furthermore, a selector may be provided into which a pulse signal outputted from the duty setting unit 24, and a DC signal that keeps up a high level, are inputted, and at an occasion when the starting time-period Ts has elapsed, the full-on-time setting unit 26 may switch the selector.

Moreover, in the embodiment, the oscillator for setting the duty ratio of the pulse signal Spwm is held in common with the oscillator for measuring the predetermined starting time-period Ts.

The control signal Scnt is inputted to the 3-state comparator 30. The 3-state comparator 30 judges voltage level of the control signal Scnt, and switches operation mode of the pulse width modulator 14.

The pulse signal S1 generated by the duty setting unit 24 and the full-on-time setting unit 26, at least, is inputted to the selector 28. In the embodiment, a high level voltage VH and a low level voltage VL are additionally inputted.

Below, a detailed explanation is given of a relationship between the control signal Scnt and the operation mode.

In cases in which the control signal Scnt is inputted fixed at a high level (the first level) to the 3-state comparator 30, the pulse width modulator 14 is set to the first mode. At this time, the 3-state comparator 30 makes the selector 28 select the pulse signal S1.

In cases in which the control signal Scnt is inputted fixed at a low level (the second level) to the 3-state comparator 30, the pulse width modulator 14 is set to the second mode. At this time, the 3-state comparator 30 makes the selector 28 select the high level voltage VH. As a result, an output signal of the selector 28, that is, the pulse signal Spwm, is a DC signal that has a high level continuously from immediately after starting.

In cases in which a signal of a pulse form, which alternately repeats the low level (the second level) and the intermediate level (the third level), is inputted, as the control signal Scnt, to the 3-stage comparator 30, the pulse width modulator 14 is set to the third mode. Specifically, in a time-period in which the control signal Scnt has a low level, the selector 28 is made to select the high level voltage VH, in the same way as in the second mode described above. The 3-state comparator 30 makes the selector 28 select the low level voltage VL in a time-period in which the control signal Scnt has the intermediate level. By the control signal Scnt repeating the low level and the intermediate level, the output signal of the selector 28, that is, the pulse signal Spwm, is a signal having the same duty ratio and the same frequency as the control signal Scnt. Attention should be given to the fact that the vibration motor 1 is set to an energization time-period during a time-period in which the control signal Scnt is at a low level, and the vibration motor 1 is set to a regeneration time-period during a time-period in which the control signal Scnt is at an intermediate level.

The pulse signal Spwm that is necessary for each of the first, second, and third modes is outputted from the pulse width modulator 14 configured in this way.

The drive signal generator 16 generates drive signals SH1, SH2, SL1, and SL2 for driving the H-bridge circuit 10 based on the pulse signal Spwm and the FG signal S_FG. Since a method of generating the drive signals by the drive signal generator 16 may be similar to that of a general motor drive circuit, a simple explanation will be given.

The drive signals SL1 and SL2 for driving the low side transistors ML1 and ML2 are generated based on the FG signal S_FG. As one example, SL1 is S_FG, and SL is generated by a logical inversion of S_FG. The drive signals SH1 and SH2 for driving the high side transistors MH1 and MH2 are generated based on the pulse signal Spwm and the FG signal S_FG. As an example, SH1 is a logical product of S_FG and Spwm, and SH2 is a logical product of the logical inversion of S_FG, and Spwm.

The dead time generator 18 delays a drive signal so that the first high side transistor MH1 and the first low side transistor ML1 are not ON at the same time, and also that the second high side transistor MH2 and the second low side transistor ML2 are not ON at the same time.

The pre-driver 20 drives the H-bridge circuit 10 based on the drive signals SH1, SH2, SL1, and SL2, that are outputted from the dead time generator 18. The pre-driver 20 is configured to include a buffer circuit that amplifies the drive signals SH1, SH2, SL1, and SL2.

A block composed of the drive signal generator 16, the dead time generator 18, and the pre-driver 20 is packaged and this may be referred to as a pre-driver.

An explanation will be given concerning operation of the motor drive circuit 100 configured as above.

Figure 2:
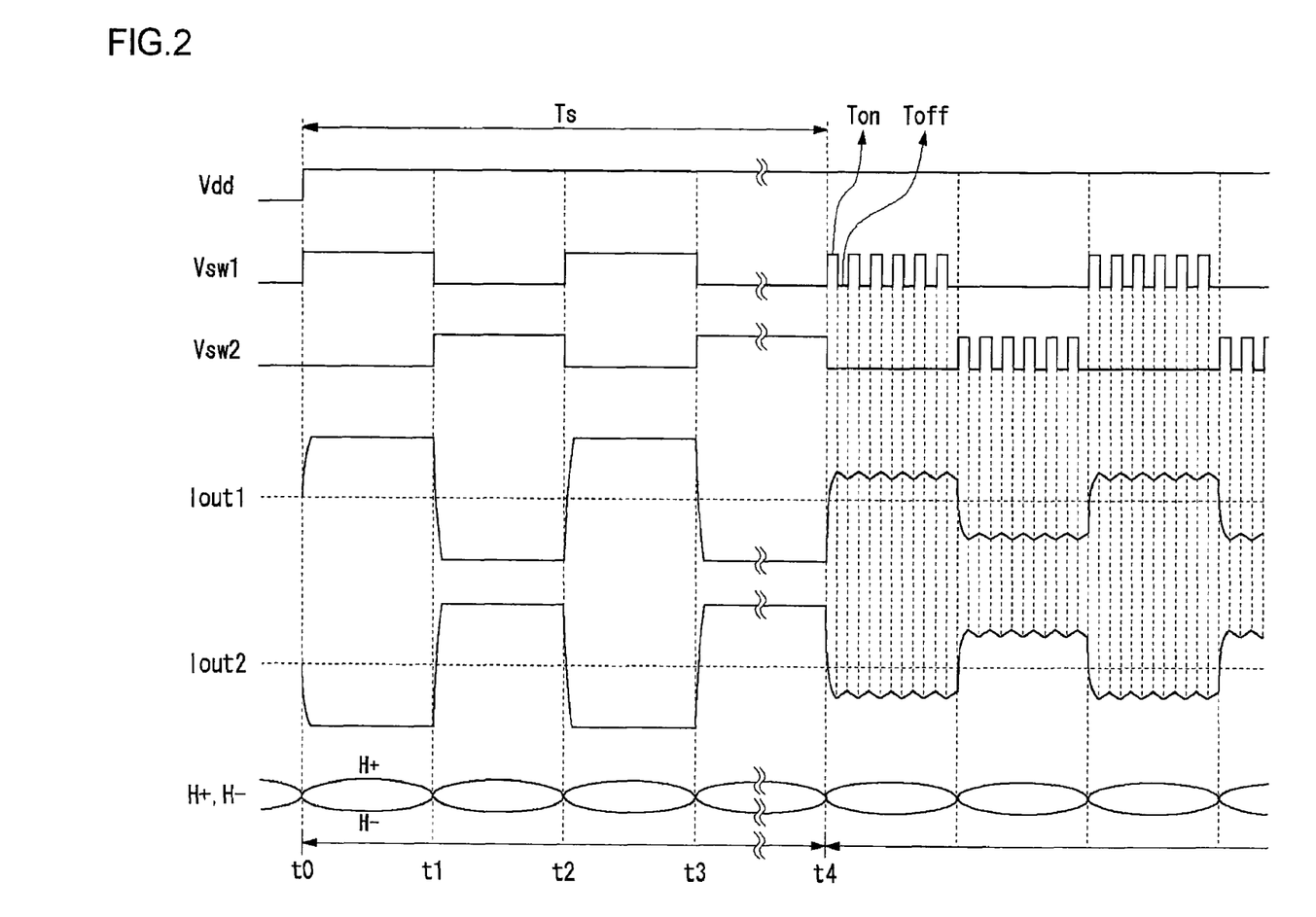
FIG. 2 is a time chart showing an operation state of the motor drive circuit of FIG. 1.

FIG. 2 is a time chart showing an operation state in the first mode of the motor drive circuit 100 of FIG. 1. FIG. 2 shows, in order from above, the power supply voltage Vdd, the switching voltages Vsw1 and Vsw2, output currents Iout1 and Iout2, and Hall signals H+ and H−. The output current Iout1 is a current directed from the terminal P1 of the coil towards the terminal P2, and the output current Iout2 is a current directed from the terminal P2 of the coil towards the terminal P1.

At time t0, when the electronic device in which the motor drive circuit 100 is installed receives an incoming message, the power supply voltage Vdd rises, and starting of rotation of the vibration motor 1 is prescribed. At this time, the control signal Scnt is set to a low level, and the first mode is selected as an operation mode. As a result, immediately after commencing starting, the duty ratio of the pulse signal Spwm is set to 100%, as described above. From time t0 to t1, the first high side transistor MH1 and the second low side transistor ML2 are ON, and Vsw1=Vdd, and Vsw2=0V. As a result, the current Iout1 that is directed from the terminal P1 towards the terminal P2 flows in the coil of the vibration motor 1, and the rotor rotates.

With the rotation of the rotor, the Hall signals H+ and H− change, and at time t1, when a level relationship is reversed, the level of the FG signal S_FG transits, by the comparator 12 of FIG. 1, and drive phase is switched. That is, in a time-period from time t2 to t3, the second high side transistor MH2 and the first low side transistor ML1 are ON, and the output current Iout2 flows in a direction from the terminal P2 of the coil towards the terminal P1.

After that, at time t3, when the level relationship of the Hall signals H+ and H− is reversed, once again, the drive phase is switched. While switching the drive phase until time t4 at which the predetermined starting time-period Ts has elapsed, the motor drive circuit 100 performs full-on-time driving of the vibration motor 1 with a duty ratio of 100%.

At time t4 at which the starting time-period Ts has elapsed from the time t0 at which starting commences, the mode is switched, and PWM driving is started. When the PWM driving is started, the first high side transistor MH1 and the second high side transistor MH2 perform switch-driving in accordance with the duty ratio of the pulse signal Spwm. As a result, as shown in FIG. 2, the output currents Iout1 and Iout2 alternately repeat an energization time-period Ton and a regeneration time-period Toff, and an average value thereof is stabilized to a value set by the duty ratio of the pulse signal Spwm. As a result, torque of the vibration motor 1 and thus rotational frequency are adjusted to a desired value.

Figure 3:
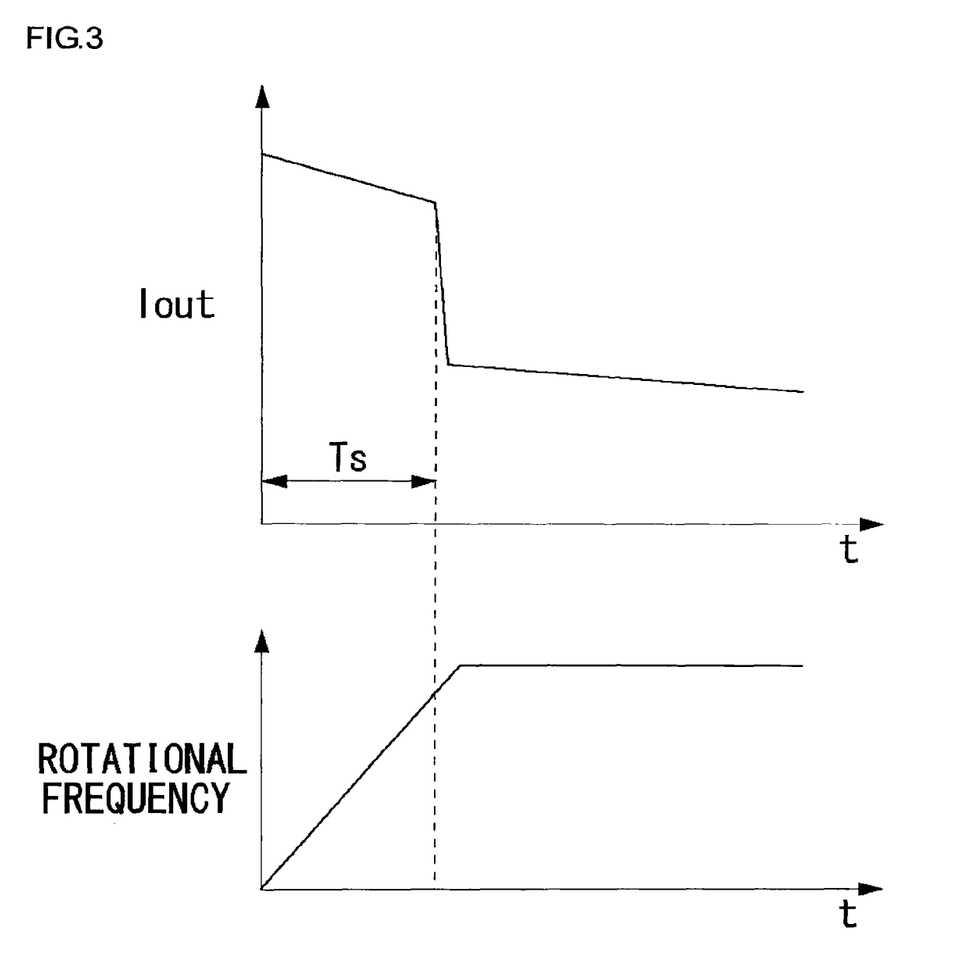
FIG. 3 is a time chart showing rotational frequency and output current of the motor drive circuit of FIG. 1.

FIG. 3 is a time chart showing output current Iout and rotational frequency of the motor drive circuit 100 of FIG. 1 in the first mode. If full-on-time driving is started with the duty ratio of 100% at time t0, the output current Iout of the motor is set high, and driving is started at a high torque. As a result, the rotational frequency of the vibration motor 1 rises quickly. After that, when the starting time Ts elapses, switching to PWM driving is done, the output current Iout is stabilized to a value in accordance with a target rotational frequency, and the rotational frequency of the vibration motor 1 is stabilized to a desired value. In cases in which it is assumed that the full-on-time driving and the PWM driving are not switched, time until the rotational frequency of the vibration motor 1 is stabilized to a predetermined value becomes long, but according to the motor drive circuit 100 according to the embodiment, it is possible to greatly shorten this time.

Furthermore, since, conventionally, the power supply voltage Vdd is raised or impedance of the vibration motor 1 is lowered, to shorten the time for the rotational frequency of the vibration motor 1 to be stabilized to a predetermined value, there has been a problem in that the output current Iout increases and power consumption increases; but in the present embodiment, increase in the output current Iout, that is, the power consumption, can be curtailed, and the time until the rotational frequency is stabilized can be shortened.

In the second mode, since the pulse signal Spwm is fixed at a high level, there is no transition to PWM driving, and the vibration motor 1 is driven by full-on-time driving shown at time t0 to t4, of FIG. 2.

Figure 4:
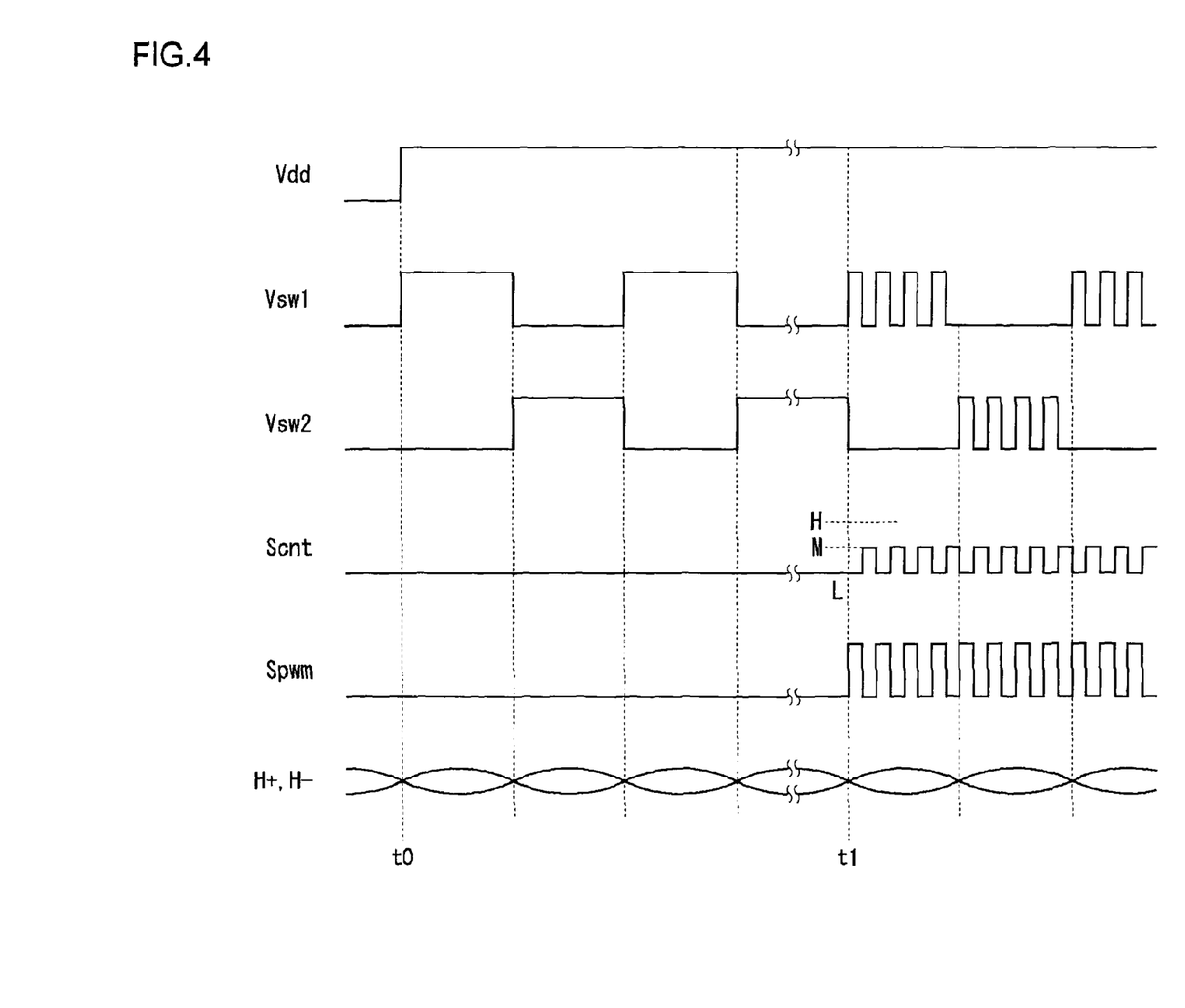
FIG. 4 is a time chart showing another operation state of the motor drive circuit of FIG. 1.

FIG. 4 is a time chart showing another operation state of the motor drive circuit 100 of FIG. 1. FIG. 4 shows, from above, in order, the power supply voltage Vdd, the switching voltages Vsw1 and Vsw2, the control signal Scnt, the pulse signal Spwm, and the Hall signals H+ and H−.

In a time-period from time t0, at which starting is commenced, until time t1, the control signal Scnt in inputted as a fixed low level signal. As a result, the pulse width modulator 14 operates in the second mode, and performs full-on-time driving of the vibration motor 1.

After that, after time t1, when the control signal Scnt becomes a signal of a pulse form which alternately repeats an intermediate level and a low level, the control signal Scnt transits to the third mode. When the control signal Scnt has the low level, the pulse signal Spwm has a high level, and when the control signal Scnt has the intermediate level, the pulse signal Spwm has a low level. In the third mode, the vibration motor 1 is PWM driven by the pulse signal Spwm that is specified according to the control signal Scnt.

According to the motor drive circuit 100 according to the embodiment, by using the third mode, it is possible to freely set the duty ratio and the frequency of the control signal Scnt from outside the motor drive circuit 100. As a result, in cases in which operation is carried out in the first mode, the duty ratio is fixed to a predetermined value, but by using the third mode, it is possible to verify an optimum frequency and duty ratio for each vibration motor 1 that is to be driven. Furthermore, it is possible to reflect the verified result, in the first mode, in the frequency of the oscillator 22, and the duty ratio set by the duty setting unit 24.

In addition, adjustment of timing of switching from the second mode to the third mode, by driving according to a sequence shown in FIG. 4, means adjusting the starting time-period Ts of FIG. 1. Therefore, according to the sequence of FIG. 4, the optimum value of the starting time-period Ts can be verified, and in addition, it is possible to reflect this in setting the starting time-period Ts in the first mode.

In this way, using the sequence of FIG. 4, since it is possible to optimize a parameter for every vibration motor 1, by verifying circuit operation, it is possible to further shorten time until the rotational frequency of the vibration motor 1 is stabilized to a desired value.

A drive sequence that uses the third mode may be used for operation verification and optimizing drive parameters such as frequency of PWM driving, duty ratio, starting time-period Ts, and the like; and in a state in which an installation is done in a real electronic device, the control signal Scnt such as shown in FIG. 4 may be generated by a DSP (Digital Signal Processor), not shown in the drawings, installed in the motor unit 2, to drive the vibration motor 1. This embodiment is particularly effective in cases in which a PWM controller or the like is installed in the electronic device.

In addition, in the embodiment, when the control signal Scnt inputted to the pulse width modulator 14 is inputted in a pulse form, design is such that the third level (the intermediate level) and the second level (the low level) are alternately repeated. Since the second level (the low level) of the control signal Scnt is common with a level used in the second mode, for either the second or the third mode, the second level (the low level) of the control signal Scnt corresponds to energization time of the coil of the vibration motor 1, to give an advantage in that circuit and signal processing can be simplified.

The abovementioned embodiment is an example, and a person skilled in the art will understand that various modified examples in combinations of various component elements and various processes thereof are possible, and that such modified examples are within the scope of the invention.

In the embodiment, an explanation was given concerning cases in which the starting time-period Ts was set and switching of the full-on-time driving and the PWM driving was performed, but with regard to the motor drive circuit 100, the rotational frequency of the vibration motor 1 may be monitored, and after commencing starting of the vibration motor 1, for a time-period until the rotational frequency of the vibration motor 1 reaches a predetermined value, the duty ratio of the pulse signal Spwm may be set to 100%. In such cases, a rotational frequency acquisition unit which monitors the rotational frequency of the vibration motor 1 is provided, and by comparing the acquired rotational frequency and the predetermined value, it is possible to realize desired processing. The rotational frequency acquisition unit may acquire the rotational frequency of the vibration motor 1 by measuring a period of the FG signal S_FG.

In the embodiment, an explanation has been given concerning cases in which the Hall element 3 is arranged outside the motor drive circuit 100, but this may be built into the motor drive circuit 100.

In the embodiment, an explanation has been given concerning cases in which the vibration motor 1 is driven, but the invention can also be applied to driving an ultra-compact fan motor. Since the ultra-compact fan motor, in the same way as the vibration motor, requires a large torque when rotation is started, preferable driving is possible by the motor drive circuit 100 according to the embodiment. In addition, the motor drive circuit 100 according to the embodiment can be used for driving various motors.

In the circuit explained in the embodiment, setting of the logical value of the high level, low level, or intermediate level signal is one example, and it is possible to freely make changes by suitable inversion by an inverter or the like.

Furthermore, according to this, substitution of an AND gate or an OR gate can be easily envisaged by a person skilled in the art. That is, each of the first level to the third level can be made to correspond to any of the high level, the low level, and the intermediate level.

In addition, in the embodiment, an explanation has been given concerning cases in which a single phase motor is driven, but application can also be made to a multiphase motor. In such cases, configuration of the switching circuit may be modified in accordance with the number of phases of the motor. Furthermore, in the embodiment, an explanation has been given concerning cases in which the motor is driven according to the Hall element, but sensorless driving may also be performed. Well known technology may be used for the sensorless driving; for example, a comparator may be provided to compare a midpoint voltage of the multi-phase coil and a reverse voltage generated in at least one coil, and an FG signal may be generated.

In addition, in the embodiment, an explanation has been given concerning cases in which the first, second and third modes are switched, but a configuration is possible in which only the first mode and the third mode are switched, or only the second mode and the third mode are switched. In such cases, when the control signal Scnt is a DC signal, the motor is driven in a drive mode (the first mode or the second mode) set in advance internally, and when the control signal Scnt is a pulse signal, the motor is driven by a pulse modulation mode (the third mode) based on the control signal Scnt. In this modified example also, it is possible to optimize the frequency and the duty ratio of the PWM driving from outside, by inputting the control signal as a pulse.

Second Embodiment

Figure 5:
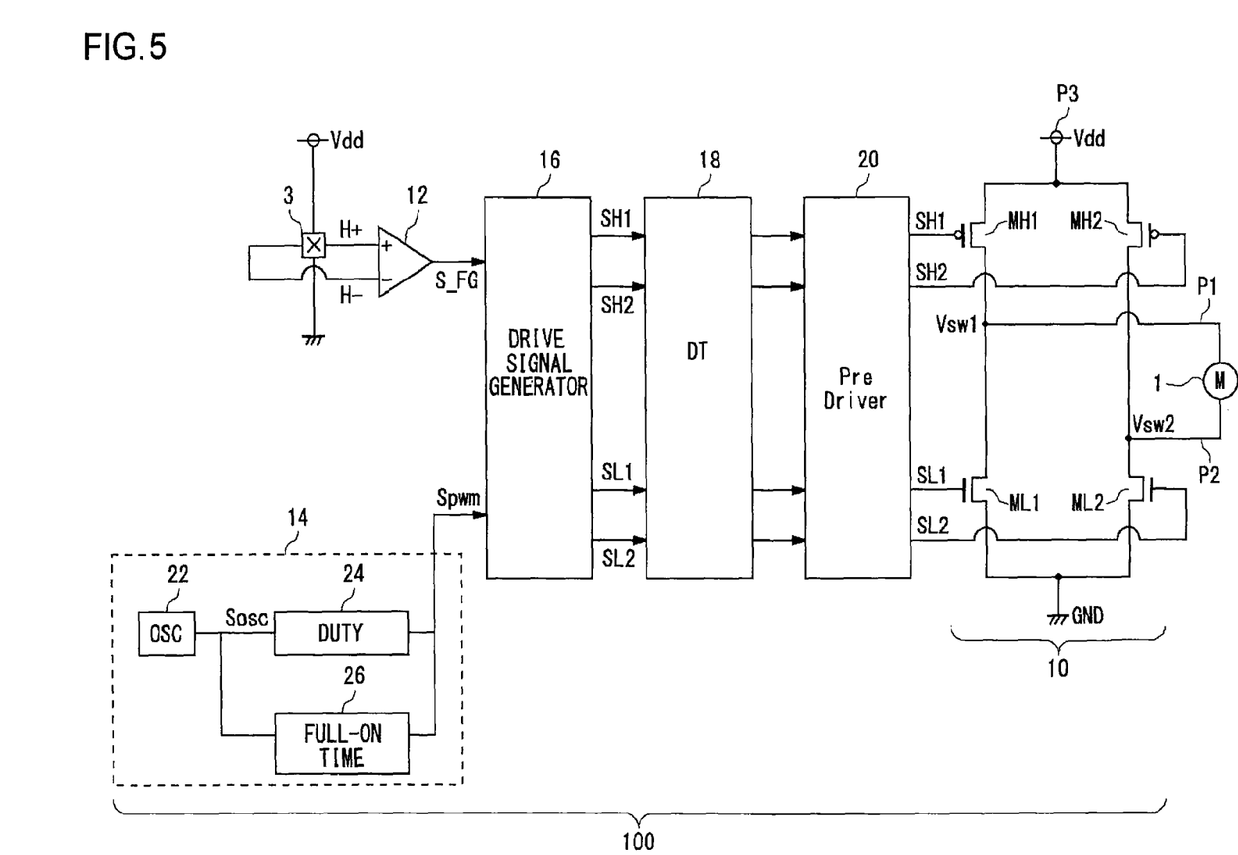
FIG. 5 is a circuit diagram showing a configuration of a motor unit including a vibration motor and a motor drive circuit for driving the vibration motor, according to a second embodiment of the invention.

FIG. 5 is a circuit diagram showing a configuration of a motor unit 2 including the vibration motor 1 and a motor drive circuit 100 for driving the vibration motor, according to a second embodiment of the invention. The motor unit 2 is provided with the vibration motor 1, a Hall element 3, and the motor drive circuit 100, and constitutes one package.

The vibration motor 1 is a brushless motor with an attached weight that is eccentric to a rotor axis, and is formed such that voltage can be applied from outside, to both terminals P1 and P2 of a coil. The Hall element 3 outputs Hall signals H+ and H− indicating position information for the rotor of the vibration motor 1. The Hall signals H+ and H− are periodic signals with mutually opposite phases, and have a frequency according to a rotational frequency of the vibration motor 1.

The motor drive circuit 100 determines drive phase of the vibration motor 1 based on the Hall signals H+ and H− outputted from the Hall element 3, and drives by controlling amount and direction of current flowing in the coil. The motor drive circuit 100 is monolithically integrated as a function IC on one semiconductor substrate.

The motor drive circuit 100 is provided with an H-bridge circuit 10, a comparator 12, a pulse width modulator 14, a drive signal generator 16, a dead time generator 18, and a pre-driver 20.

The H-bridge circuit 10 is connected to the terminals P1 and P2 of the vibration motor 1 that is to be driven. The H-bridge circuit 10 includes a first high side transistor MH1, a second high side transistor MH2, a first low side transistor ML1, and a second low side transistor ML2. This H-bridge circuit 10 is equivalent to an output stage for driving the vibration motor 1. The first high side transistor MH1 and the first low side transistor ML1 are connected in series between a power supply voltage terminal P3 and a ground terminal GND. In the same way, the second high side transistor MH2 and the second low side transistor ML2 are also connected in series between the power supply voltage terminal P3 and the ground terminal GND. In the embodiment, the first high side transistor MH1 and the second high side transistor MH2 are P-channel MOSFETs. Furthermore, the first low side transistor ML1 and the second low side transistor ML2 are N-channel MOSFETs. These transistors may all be N-channel MOSFETs, or may be bipolar transistors.

A first switching voltage Vsw1 of a connection point of the first high side transistor MH1 and the first low side transistor ML1 is applied to the first terminal P1 of the vibration motor 1. ON and OFF states of the first high side transistor MH1 and the first low side transistor ML1 are controlled by a first high side drive signal SH1 and a first low side drive signal SL1 applied to a gate of each transistor. When the first high side transistor MH1 is ON, the first switching voltage Vsw1 is the power supply voltage Vdd, and when the first low side transistor ML1 is ON, the first switching voltage Vsw1 is ground potential (0V).

In the same way, a second switching voltage Vsw2 of a connection point of the second high side transistor MH2 and the second low side transistor ML2 is connected to the second terminal P2 of the vibration motor 1. ON and OFF states of the second high side transistor MH2 and the second low side transistor ML2 are controlled by a second high side drive signal SH2 and a second low side drive signal SL2 applied to a gate of each transistor.

In the embodiment, among the transistors constituting the H-bridge circuit 10, with the low side transistors ML1 and ML2 fixed to be ON or OFF, the high side transistors MH1 and MH2 are switch-driven based on a pulse signal Spwm. Clearly, in another embodiment, in place of the high side transistors MH1 and MH2, the low side transistors ML1 and ML2 may be switch-driven based on the pulse signal Spwm.

A comparator 12 receives the Hall signals H+ and H− indicating position information of the rotor of the vibration motor 1, and by performing a voltage comparison thereof, makes a conversion to an FG signal S_FG, which is a rectangular signal. The comparator 12, according to necessity, after amplifying the Hall signals H+ and H−, may perform a voltage comparison.

The pulse width modulator 14 generates the pulse-modulated pulse signal Spwm specifying energization time of the coil of the vibration motor 1. The pulse width modulator 14, after commencing starting of the vibration motor 1, sets a duty ratio of the pulse signal Spwm to 100%, and after that, the duty ratio of the pulse signal Spwm is switched in accordance with rotational frequency of the vibration motor 1. That is, the motor drive circuit 100 switches between full-on-time driving in which driving is done with the pulse signal Spwm having a duty ratio of 100%, and PWM driving in which the duty ratio is set in accordance with a target torque (rotational frequency).

In the embodiment, the pulse width modulator 14 sets the duty ratio of the pulse signal Spwm to 100%, from commencing starting of the vibration motor 1, for a predetermined starting time-period Ts. The pulse width modulator 14 includes an oscillator 22, a duty setting unit 24, and a full-on-time setting unit 26.

The oscillator 22 generates a pulse signal Sosc of a predetermined frequency. The full-on-time setting unit 26 uses the pulse signal Sosc from the oscillator 22 to measure the predetermined start time-period Ts, and during this time, sets the duty ratio of the pulse signal Spwm to 100%. The duty setting unit 24 uses the pulse signal Sosc outputted from the oscillator 22 to set the duty ratio of the pulse signal Spwm to a predetermined value. That is, in the embodiment, the oscillator for setting the duty ratio of the pulse signal Spwm is held in common with the oscillator for measuring the predetermined starting time-period Ts. In a certain example, the duty setting unit 24 and the full-on-time setting unit 26 can be configured to include a counter.

As an example of specific signal processing, the full-on-time setting unit 26 outputs a signal at a high level, in a time-period from commencing starting until the starting time-period Ts elapses, and after that, outputs a signal that transits to a low level. On the other hand, the duty setting unit 24 continues to output a pulse signal whose duty ratio has a predetermined value. A signal of a logical sum of the full-on-time setting unit 26 and the duty setting unit 24 is the pulse signal S1 that has the abovementioned characteristic.

Furthermore, a selector may be provided into which a pulse signal outputted from the duty setting unit 24, and a DC signal that maintains a high level, are inputted, and at an occasion when the starting time-period Ts has elapsed, the full-on-time setting unit 26 may switch the selector.

The drive signal generator 16 generates drive signals SH1, SH2, SL1, and SL2 for driving the H-bridge circuit 10 based on the pulse signal Spwm and the FG signal S_FG. Since a method of generating the drive signals by the drive signal generator 16 may be similar to that of a general motor drive circuit, a simple explanation will be given.

The drive signals SL1 and SL2 for driving the low side transistors ML1 and ML2 are generated based on the FG signal S_FG. As one example, SL1 is S_FG, and SL is generated by a logical inversion of S_FG. The drive signals SH1 and SH2 for driving the high side transistors MH1 and MH2, are generated based on the pulse signal Spwm and the FG signals_FG. As an example, SH1 is a logical product of S_FG and Spwm, and SH2 is a logical product of the logical inversion of S_FG, and Spwm.

The dead time generator 18 delays a drive signal so that the first high side transistor MH1 and the first low side transistor ML1 are not ON at the same time, and also that the second high side transistor MH2 and the second low side transistor ML2 are not ON at the same time.

The pre-driver 20 drives the H-bridge circuit 10 based on the drive signals SH1, SH2, SL1, and SL2, that are outputted from the dead time generator 18. The pre-driver 20 is configured to include a buffer circuit that amplifies the drive signals SH1, SH2, SL1, and SL2.

An explanation will be given concerning operation of the motor drive circuit 100 configured as above.

Figure 6:
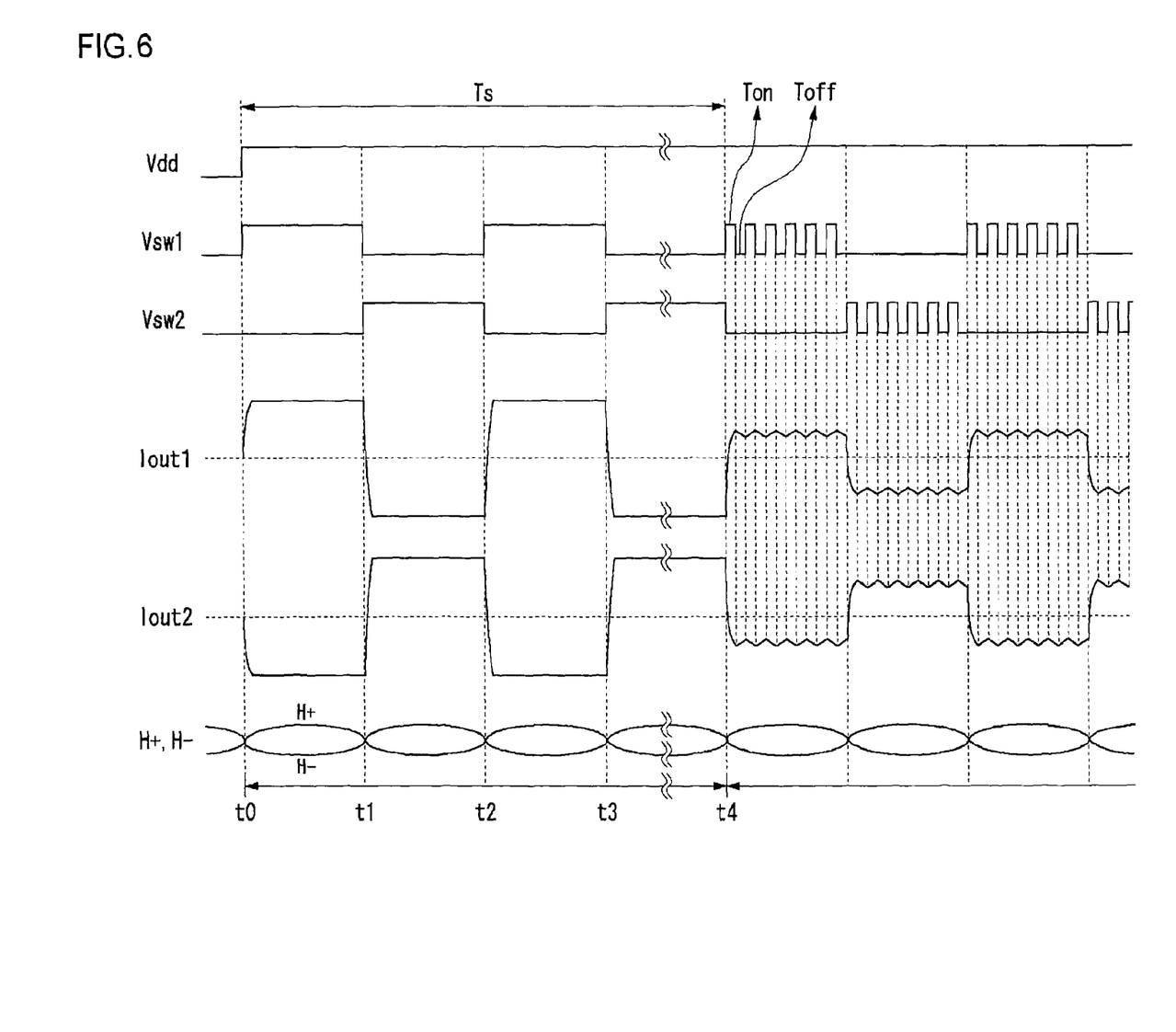
FIG. 6 is a time chart showing an operation state of the motor drive circuit of FIG. 5.

FIG. 6 is a time chart showing an operation state of the motor drive circuit 100 of FIG. 5. FIG. 6 shows, in order, from above, the power supply voltage Vdd, the switching voltages Vsw1 and Vsw2, output currents Iout1 and Iout2, and the Hall signals H+ and H−. The output current Iout1 is a current directed from the terminal P1 of the coil of the vibration motor 1 towards the terminal P2, and the output current Iout2 is a current directed from the terminal P2 of the coil towards the terminal P1.

At time t0, when the electronic device in which the motor drive circuit 100 is installed receives an incoming message, the power supply voltage Vdd rises, and starting of rotation of the vibration motor 1 is prescribed. Immediately after commencing starting, the duty ratio of the pulse signal Spwm is set to 100%, as described above. From time t0 to t1, the first high side transistor MH1 and the second low side transistor ML2 are ON, and Vsw1=Vdd, and Vsw2=0V. As a result, the current Iout1 that is directed from the terminal P1 towards the terminal P2 flows in the coil of the vibration motor 1, and the rotor rotates. With the rotation of the rotor, the Hall signals H+ and H− change, and at time t1, when the level relationship is reversed, the level of the FG signal S_FG transits, by the comparator 12 of FIG. 5, and a drive phase is switched. That is, in a time-period from time t2 to t3, the second high side transistor MH2 and the first low side transistor ML1 are ON, and the output current Iout2 flows in a direction from the terminal P2 of the coil towards the terminal P1.

After that, at time t3, when the relationship of the Hall signals H+ and H− is reversed, once again, the drive phase is switched. While switching the drive phase until time t4 at which the predetermined starting time-period Ts has elapsed, the motor drive circuit 100 performs full-on-time driving of the vibration motor 1 with a duty ratio of 100%.

At time t4 at which the starting time-period Ts has elapsed from the time t0 at which starting commences, the mode is switched, and PWM driving is started. When the PWM driving is started, the first high side transistor MH1 and the second high side transistor MH2 perform switch-driving in accordance with the duty ratio of the pulse signal Spwm. As a result, as shown in FIG. 6, the output currents Iout1 and Iout2 alternately repeat an energization time-period Ton and a regeneration time-period Toff, and an average value thereof is stabilized to a value set by the duty ratio of the pulse signal Spwm. As a result, torque of the vibration motor 1 and thus rotational frequency are adjusted to a desired value.

Figure 7:
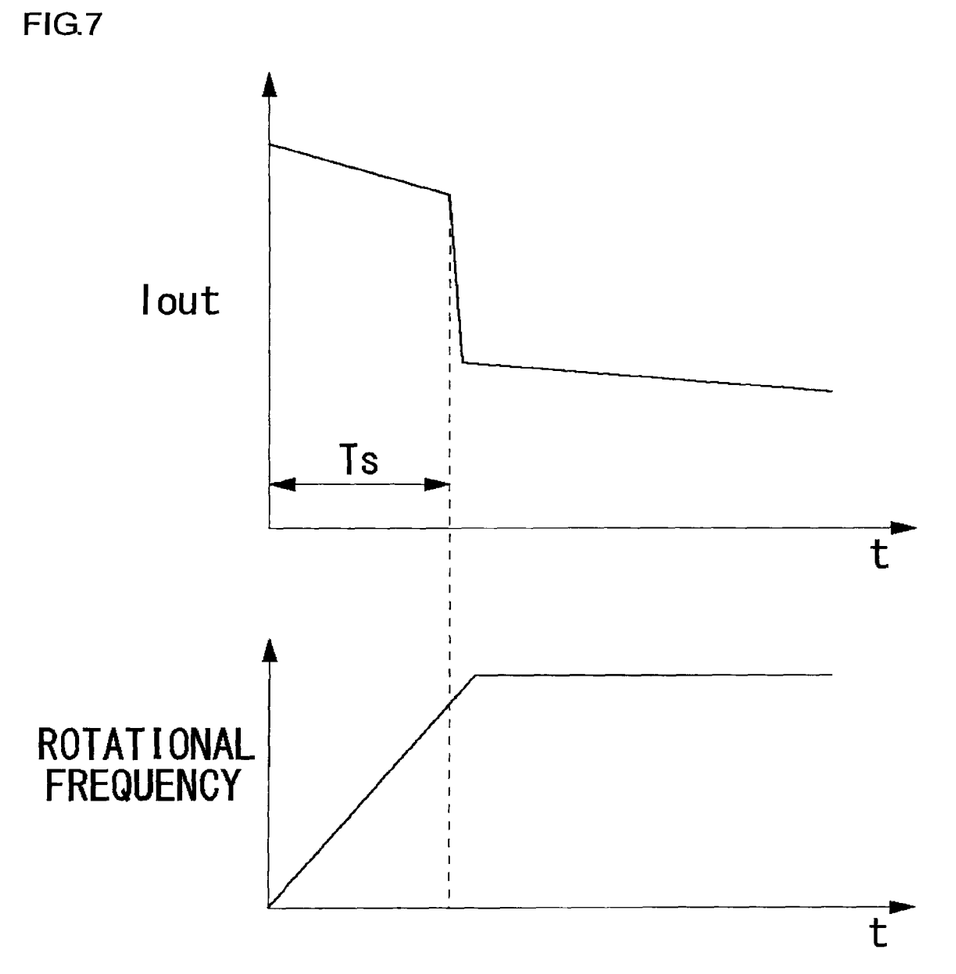
FIG. 7 is a time chart showing output current and rotational frequency of the motor drive circuit of FIG. 5.

FIG. 7 is a time chart showing output current Iout and the rotational frequency of the motor drive circuit 100 of FIG. 5. After time t0, when the vibration motor 1 is at full drive with the duty ratio at 100%, the output current Iout of the motor is set high, and driving is started at a high torque. As a result, the rotational frequency of the vibration motor 1 rises quickly. After that, when the starting time-period Ts elapses, switching to PWM driving is done, the output current Iout is stabilized to a value in accordance with a target rotational frequency, and the rotational frequency of the vibration motor 1 is stabilized to a desired value. In cases in which it is assumed that the full-on-time driving and the PWM driving are not switched, time until the rotational frequency of the vibration motor 1 is stabilized to a predetermined value becomes long, but according to the motor drive circuit 100 according to the embodiment, it is possible to greatly shorten this time.

Furthermore, since, conventionally, the power supply voltage Vdd is raised or impedance of the vibration motor 1 is lowered, to shorten the time for the rotational frequency of the vibration motor 1 to be stabilized to a predetermined value, there has been a problem in that the output current Iout increases and power consumption increases; but in the present embodiment, increase in the output current Iout, that is, the power consumption, can be curtailed, and the time until the rotational frequency is stabilized can be shortened.

The abovementioned embodiment is an example, and a person skilled in the art will understand that various modified examples in combinations of various component elements and various processes thereof are possible, and that such modified examples are within the scope of the invention.

In the embodiment, an explanation was given concerning cases in which the starting time-period Ts was set and switching of the full-on-time driving and the PWM driving was performed, but with regard to the motor drive circuit 100, the rotational frequency of the vibration motor 1 may be monitored, and after commencing starting the vibration motor 1, for a time-period until the rotational frequency of the vibration motor 1 reaches a predetermined value, the duty ratio of the pulse signal Spwm may be set to 100%. In such cases, a rotational frequency acquisition unit which monitors the rotational frequency of the vibration motor 1 is provided, and by comparing the acquired rotational frequency and the predetermined value, it is possible to realize desired processing. The rotational frequency acquisition unit may acquire the rotational frequency of the vibration motor 1 by measuring a period of the FG signal S_FG.

In the embodiment, an explanation has been given concerning cases in which the Hall element 3 is arranged outside the motor drive circuit 100, but this may be built into the motor drive circuit 100.

In the embodiment, an explanation has been given concerning cases in which the vibration motor 1 is driven, but the invention can also be applied to driving an ultra-compact fan motor. Since the ultra-compact fan motor, in the same way as the vibration motor, requires a large torque when rotation is started, preferable driving is possible by the motor drive circuit 100 according to the embodiment.

In the circuit explained in the embodiment, setting of the logical value of the high level or low level signal is one example, and it is possible to freely make changes by suitable inversion by an inverter or the like. Furthermore, according to this, substitution of an AND gate or an OR gate can be easily envisaged by a person skilled in the art.

While the preferred embodiments of the present invention have been described using specific terms, such description is for illustrative purposes only, and it is to be understood that changes and variations may be made without departing from the spirit or scope of the appended claims.

The invention claimed is:

1. A motor drive circuit comprising:
   an H-bridge circuit connected to a coil of a motor that is to be driven;
   a comparator which receives a Hall signal indicating position information of a rotor of the motor and converts the Hall signal into a rectangular signal;
   a pulse modulator which generates a pulse-modulated pulse signal specifying energization time of the coil of the motor; and
   a pre-driver which drives the H-bridge circuit based on the pulse signal and the rectangular signal; wherein:
   the pulse modulator is configured to enable switching between
   a first mode in which, after commencing starting of the motor, a duty ratio of the pulse signal is set to 100% and, after that, the duty ratio is switched to a predetermined value in accordance with rotational frequency of the motor;
   a second mode in which the duty ratio of the pulse signal continues to be set to 100%; and
   a third mode in which the duty ratio and frequency of the pulse signal are set, based on a control signal of a pulse form inputted from outside.

2. A motor drive circuit according to claim 1, wherein:
   a control signal inputted from outside is inputted to the pulse modulator, and an operation mode is switched in accordance with voltage level of the control signal; and
   the control signal, when at a first level, is set to the first mode, the control signal, when at a second level different from the first level, is set to the second mode, and the control signal, when inputted in a pulse form, is set to the third mode.

3. A motor drive circuit according to claim 2, wherein:
   the control signal inputted to the pulse modulator, when inputted in a pulse form, alternately repeats a third level different from the first level and the second level, and either one of the first and the second levels, at a predetermined frequency and duty ratio.

4. A motor drive circuit according to claim 3, wherein:
   the control signal inputted to the pulse modulator, when inputted in a pulse form, alternately repeats the third level and the second level, and
   the pulse modulator sets a logical value of the pulse signal so as to energize the coil of the motor when the control signal is at the second level, and so that the motor regenerates when at the third level.

5. A motor drive circuit according to claim 3, wherein the third level is an intermediate level between the first level and the second level.

6. A motor drive circuit according to claim 1, wherein the pulse modulator, in the first mode, sets the duty ratio of the pulse signal to 100%, in a predetermined time-period from commencing starting of the motor.

7. A motor drive circuit according to claim 1, wherein the pulse modulator, in the first mode, sets the duty ratio of the pulse signal to 100%, in a time-period after commencing starting of the motor until rotational frequency of the motor reaches a predetermined value.

8. A motor drive circuit according to claim 1, wherein the motor drive circuit is monolithically integrated on one semiconductor substrate.

9. A motor unit comprising:
   a vibration motor;
   a Hall element which outputs a Hall signal indicating position information of a rotor of the vibration motor; and
   the drive circuit according to claim 1, which drives the vibration motor based on the Hall signal.

10. An electronic device comprising:
    a communication unit which communicates with a base station; and
    the motor unit according to claim 9;
    wherein, when a messages arrives from the base station, the communication unit prescribes rotation of the vibration motor to the motor unit.

11. A motor drive circuit comprising:
    a switching circuit which includes a plurality of transistors connected to a coil of a motor that is to be driven, and adjusts power supplied to the coil by making the transistors perform a switching operation;
    at least one comparator which detects a position of a rotor of the motor and generates an FG (Frequency Generation) signal in accordance with the detected position;
    a pre-driver which drives the switching circuit based on, at least, the FG signal; and
    a selector which switches drive mode of the motor drive circuit based on a control signal inputted from outside; wherein
    the selector selects a first mode or a second mode when the control signal is a DC signal, and selects a third mode when the control signal is a pulse signal, and wherein
    (i) in the first mode, after commencing starting of the motor, a duty ratio of the pulse signal is set to 100% and, after that, the duty ratio is switched to a predetermined value in accordance with rotational frequency of the motor,
    (ii) in the second mode, the duty ratio of the pulse signal continues to be set to 100%; and
    (iii) in the third mode, the duty ratio and frequency of the pulse signal are set, based on a control signal of a pulse form inputted from outside.

12. A method of driving a motor, the method comprising:
    converting a Hall signal indicating position information of a rotor of the motor that is to be driven, into a rectangular signal;
    selecting, among transistors that constitute a H-bridge circuit connected to a coil of the motor, based on the rectangular signal, either group of two groups of transistor pairs disposed in opposing corners, to be driven;
    generating a pulse signal in a mode selected among three different modes; and
    driving the selected transistor pair based on the pulse signal; wherein
    the step of generating the pulse signal,
    in a first mode, after commencing starting of the motor, sets a duty ratio of the pulse signal to 100%, and after that, sets the duty ratio to a predetermined value in accordance with rotational frequency of the motor,
    in a second mode, continues to set the duty ratio to 100%, and
    in a third mode, sets the duty ratio and frequency of the pulse signal, based on a control signal of a pulse form, which is inputted from outside.

13. A method of driving a motor, the method comprising:
    detecting a position of a rotor of the motor that is to be driven, and generating an FG (Frequency Generation) signal in accordance with the detected position;
    adjusting power supplied to a coil of the motor, by controlling ON and OFF states of a plurality of transistors connected to the coil of the motor that is to be driven, based on, at least the FG signal; and switching drive mode based on a control signal inputted from outside; wherein a first mode or a second mode is selected when the control signal is a DC signal, and a third mode is selected when the control signal is a pulse signal, and wherein (iv) in the first mode, after commencing starting of the motor, a duty ratio of the pulse signal is set to 100% and, after that, the duty ratio is switched to a predetermined value in accordance with rotational frequency of the motor, (v) in the second mode, the duty ratio of the pulse signal continues to be set to 100%; and (vi) in the third mode, the duty ratio and frequency of the pulse signal are set, based on a control signal of a pulse form inputted from outside.

14. A drive circuit of a vibration motor, the circuit comprising:

a H-bridge circuit connected to a coil of the vibration motor that is to be driven;

a comparator which receives a Hall signal indicating position information of a rotor of the vibration motor, and converts the signal into a rectangular signal;

a pulse modulator which generates a pulse-modulated pulse signal specifying energization time of the coil of the vibration motor; and a pre-driver which drives the H-bridge circuit based on the pulse signal and the rectangular signal; wherein the pulse modulator is configured to enable switching between a first mode in which, after commencing starting of the motor, a duty ratio of the pulse signal is set to 100% and, after that, the duty ratio is switched to a predetermined value in accordance with rotational frequency of the motor;

a second mode in which the duty ratio of the pulse signal continues to be set to 100%; and a third mode in which the duty ratio and frequency of the pulse signal are set, based on a control signal of a pulse form inputted from outside.

15. A drive circuit according to claim 14, wherein the pulse modulator sets the duty ratio of the pulse signal to 100% in a predetermined time-period from commencing start-up of the vibration motor.

16. A drive circuit according to claim 15, wherein the pulse modulator holds in common an oscillator for setting the duty ratio of the pulse signal to a predetermined value in accordance with the rotational frequency of the vibration motor, and the oscillator for measuring the predetermined time-period.

17. A drive circuit according to claim 14, wherein the pulse modulator sets the duty ratio of the pulse signal to 100% in a time-period, after commencing start-up of the vibration motor, until the rotational frequency of the vibration motor reaches the predetermined value.

18. A drive circuit according to claim 14, wherein the drive circuit is monolithically integrated on one semiconductor substrate.

19. A motor unit comprising:

a vibration motor;

a Hall element which outputs a Hall signal indicating position information of a rotor of the vibration motor; and the drive circuit according to claim 14, which drives the vibration motor based on the Hall signal.

20. An electronic device comprising:

a communication unit which communicates with a base station; and a motor unit;

wherein when a messages arrives from the base station, the communication unit prescribes rotation of the vibration motor, to the motor unit, and wherein the motor unit comprises:

a vibration motor;

a Hall element which outputs a Hall signal indicating position information of a rotor of the vibration motor; and the drive circuit which drives the vibration motor based on the Hall signal, and wherein the drive circuit comprises a vibration motor;

a Hall element which outputs a Hall signal indicating position information of a rotor of the vibration motor; and a drive circuit configured to drive the vibration motor, the drive circuit comprising:

a H-bridge circuit connected to a coil of the vibration motor that is to be driven;

a comparator which receives a Hall signal indicating position information of a rotor of the vibration motor, and converts the signal into a rectangular signal;

a pulse modulator which generates a pulse-modulated pulse signal specifying energization time of the coil of the vibration motor; and a pre-driver which drives the H-bridge circuit based on the pulse signal and the rectangular signal; wherein after commencing start-up of the vibration motor, the pulse modulator sets a duty ratio of the pulse signal to 100%, and after that, switches the duty ratio to a predetermined value in accordance with rotational frequency of the vibration motor.

* * * * *